US008120619B2

(12) United States Patent
Sugimoto

(10) Patent No.: US 8,120,619 B2
(45) Date of Patent: Feb. 21, 2012

(54) CHARACTER DISPLAY DEVICE AND CHARACTER DISPLAY METHOD

(75) Inventor: Makoto Sugimoto, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 115 days.

(21) Appl. No.: 11/508,285

(22) Filed: Aug. 23, 2006

(65) Prior Publication Data

US 2007/0226611 A1 Sep. 27, 2007

(30) Foreign Application Priority Data

Mar. 27, 2006 (JP) .................................. 2006-85313

(51) Int. Cl.
*G09G 5/00* (2006.01)
*G06T 11/00* (2006.01)
*G06K 9/72* (2006.01)

(52) U.S. Cl. ......... 345/619; 345/467; 345/636; 382/229

(58) Field of Classification Search .................. 345/636, 345/467, 947; 382/181, 229, 243; 715/200
See application file for complete search history.

(56) References Cited

U.S. PATENT DOCUMENTS

| | | | | |
|---|---|---|---|---|
| 4,556,951 A * | 12/1985 | Dickman et al. | ............... | 712/223 |
| 4,975,828 A * | 12/1990 | Wishneusky et al. | ............ | 710/11 |
| 5,537,486 A * | 7/1996 | Stratigos et al. | ............... | 382/137 |
| 5,659,822 A * | 8/1997 | Sasagaki et al. | ............... | 396/287 |
| 5,875,263 A * | 2/1999 | Froessl | ........................... | 382/181 |
| 5,910,849 A * | 6/1999 | Tamagaki | ...................... | 358/442 |
| 6,208,744 B1 * | 3/2001 | Ishige et al. | .................. | 382/100 |
| 6,324,554 B1 * | 11/2001 | Watanabe et al. | .............. | 715/235 |
| 6,341,176 B1 * | 1/2002 | Shirasaki et al. | .............. | 382/229 |
| 6,542,161 B1 * | 4/2003 | Koyama et al. | ................ | 345/589 |
| 6,775,024 B1 * | 8/2004 | Fischer | .......................... | 358/1.15 |
| 7,176,929 B1 * | 2/2007 | Morrish | .......................... | 345/545 |
| 2002/0158913 A1 * | 10/2002 | Yamaguchi et al. | ........... | 345/810 |
| 2003/0110402 A1 * | 6/2003 | Park | ............................... | 713/202 |
| 2003/0179231 A1 * | 9/2003 | Kamiwada et al. | ............ | 345/757 |
| 2003/0191825 A1 * | 10/2003 | Miyazaki et al. | ............... | 709/220 |
| 2004/0198457 A1 * | 10/2004 | Hayashida et al. | ............ | 455/566 |
| 2006/0242593 A1 * | 10/2006 | Gaebel | ........................... | 715/771 |

FOREIGN PATENT DOCUMENTS

| | | |
|---|---|---|
| JP | 11-272256 A | 10/1999 |
| JP | 2003-141044 | 5/2003 |

OTHER PUBLICATIONS

Japanese Office Action mailed Oct. 4, 2011 for corresponding Japanese Application No. 2006-085313, with English-language Translation.

* cited by examiner

*Primary Examiner* — David T Welch
(74) *Attorney, Agent, or Firm* — Fujitsu Patent Center

(57) ABSTRACT

The present invention is intended to speed up rendering that is performed in the course of displaying a document that contains both icons and characters. A character display device that displays a document containing both icons and characters includes: a searching unit that searches the position in the document where an icon appears, a counter unit that counts the number of characters which successively appear until the position where the icon appears searched by the searching unit; and a rendering unit that renders the same number of characters, which successively appear, as the number of characters counted by the counter after designating the attributes shared by the characters, and then renders the icon after designating the attributes of the icon.

6 Claims, 4 Drawing Sheets

FIG.2

| i = 0 | 1 | 2 | 3 | 4 | 5 | 6 | 7 | 8 | 9 |
|---|---|---|---|---|---|---|---|---|---|
| あ | い | う | ♡ | A | B | ☆ | a | b | e |

| i = 10 | 11 | 12 | 13 | 14 | 15 | 16 | 17 | 18 | 19 |
|---|---|---|---|---|---|---|---|---|---|
| 山 | 川 | ☺ | ♪ | イ | ロ | ハ | 。 | 今 | 日 |

| i = 20 | 21 | 22 | 23 | 24 | 25 | 26 | 27 | 28 | 29 |
|---|---|---|---|---|---|---|---|---|---|
| は | ☂ | を | 忘 | れ | た | の | で | 雨 | に |

FIG. 4

| REGISTERED NUMBER | ICON | CHARACTER CODE | COLOR | BACKGROUND COLOR |
|---|---|---|---|---|
| 1 | ♡ | 1 2 3 a a a | RED | WHITE |
| 2 | ☆ | 1 2 3 b b b | YELLOW | BLUE |
| 3 | ☾ | 1 2 3 c c c | YELLOW | BLUE |
| ⋮ | ⋮ | ⋮ | ⋮ | ⋮ |
| 11 | ♡ | 1 2 3 a a b | BLUE | WHITE |
| ⋮ | ⋮ | ⋮ | ⋮ | ⋮ |
| 21 | ☺ | 1 3 4 d e f | ORANGE | BLUE |
| 22 | ☹ | 1 3 4 d e g | ORANGE | BLUE |
| ⋮ | ⋮ | ⋮ | ⋮ | ⋮ |
| 51 | ♫ | 2 2 2 l m n | BLACK | YELLOW |
| ⋮ | ⋮ | ⋮ | ⋮ | ⋮ |

CHARACTER DISPLAY DEVICE AND CHARACTER DISPLAY METHOD

BACKGROUND OF THE INVENTION

1. Field of the Invention

The present invention relates to a character display method for handheld devices, or more particularly, to a character display device, a character display method, and a character display program that can display a document containing both icons and characters.

2. Description of the Related Art

As far as conventional handheld devices are concerned, when a document containing both icons and characters is displayed, the attributes of each letter are designated irrespective of whether the letter is a icon or a character. The icon or character whose attributes have been designated is then rendered. Thus, the document containing both icons and characters is displayed. Therefore, when an icon or a character contained in a document containing both icons and characters is rendered in the conventional handheld device, the attributes of each letter must be determined irrespective of whether the letter is an icon or a character. It therefore takes much time to render each letter. By the way, in this specification, the icon shall refer to a picture having the size of a character, and the character shall refer to a character or symbol capable of being entered at a computer.

The attributes of a character or an icon include a color (red, blue, yellow, etc.), a font type (Mincho type, Gothic type, etc.), a font typeface (standard fact, italic face, boldface, etc.), a font size (8, 12, 16, etc.), and a background color (white, black, yellow, etc.).

Patent Document 1 describes a method of searching mails, which are preserved in a portable cellular phone, for a mail containing a specific character string or icon. According to the first embodiment described in Patent Document 1, mails are searched to see if their subjects and/or texts contain a specific character string. According to the second embodiment described in Patent Document 1, mails are searched according to a color of an icon contained in the mails. Specific codes representing icons include a code representing the pattern of an icon and a code representing the color thereof. In Patent Document 1, the code representing the color of an icon is checked to discriminate the icon.

Patent Document 1: Japanese Unexamined Patent Publication No. 2003-141044 (refer to Claims and Paragraphs in Specification [0001], [0005], [0030] to [0032])

However, according to the method of searching a mail preserved in a portable cellular phone described in Patent Document 1, a long processing time is required for displaying a document which contains both icons and characters, and it takes much time to display the document.

SUMMARY OF THE INVENTION

The present invention addresses the above problems. An object of the present invention is to provide a character display device, a character display method, and a character display program that require a short processing time for displaying a document containing kinds of characters which are different from each other in terms of an attribute, for example, a document containing both icons and characters, and that enjoy a high rendering speed.

A character display device in accordance with the first aspect of the present invention intended to accomplish the foregoing object displays a document that contains kinds of characters which are different from each other in terms of an attribute.

The character display device includes: a counting unit for counting the number of characters, which share a first attribute and successively appear in a document, until a character having a second attribute different from the first attribute appears; and a rendering unit for rendering the same number of characters, which share the first attribute, as the number of characters counted by the counting unit after designating the attributes shared by the characters, and then rendering the character, which has the second attribute, after designating the attributes of the character.

The character display device further comprises a searching unit for searching for the position in the document where a character having a second attribute different from a first attribute appears, wherein said searching unit searches by checking whether a character code representing the character having the second attribute agrees with any of character codes previously registered in association with respective icons in an icon registration table.

In the character display device, characters having a first attribute are characters other than icons and characters having a second attribute are icons.

A character display method in accordance with the first aspect of the present invention intended to accomplish the aforesaid object displays a document that contains kinds of characters which are different from each other in terms of an attribute.

The character display method includes: a counting step of counting the number of characters, which share a first attribute and successively appear in the document, until a character having a second attribute different from the first attribute appears; and a rendering step of rendering the same number of characters, which share the first attribute, as the number of characters counted at the counting step after designating the attributes shared by the characters, and then rendering the character, which has the second attribute, after designating the attributes of the characters.

The character display method further comprises: a searching step of searching for the position in the document where an icon appears, wherein said searching step searches by checking whether a character code representing the character having the second attribute agrees with any of character codes previously registered in association with respective icons in an icon registration table.

A computer-readable recording medium in accordance with the first aspect of the present invention intended to accomplish the aforesaid object in which a program for displaying a document that contains kinds of characters which are different from each other in terms of an attribute is recorded.

The character display program allows a computer to execute: a counting step of counting the number of characters, which share a first attribute and successively appear in the document, until a character having a second attribute different from the first attribute appears; and a rendering step of rendering the same number of characters, which share the first attribute, as the number of characters counted at the counting step after designating the attributes shared by the characters, and then rendering the character, which has the second attribute, after designating the attributes of the character.

According to the character display method in which the first aspect of the present invention is implemented, characters sharing the first attribute and successively appearing in a document that contains kinds of characters different from each other in terms of an attribute are not rendered until a character having the second attribute different from the first attribute appears. When the character having the second attribute appears, the same number of characters, which share the first attribute, as the number of characters that successively appear and share the first attribute is rendered after the attributes shared by the characters are designated. Thereafter, the character having the second attribute is rendered. This speeds up rendering of a document.

According to the character display method, the position in a document, which contains both icons and characters, where an icon appears is searched. The same number of characters as the number of characters that successively appear until the searched position where the icon appears is rendered after the attributes shared by the characters are designated. Thereafter, the icon is rendered. This speeds up rendering of a document.

BRIEF DESCRIPTION OF THE DRAWINGS

FIG. 2 shows a concrete example of display of a document containing both characters and icons;

FIG. 4 shows an icon registration table.

DESCRIPTION OF THE PREFERRED EMBODIMENTS

Figure 1:
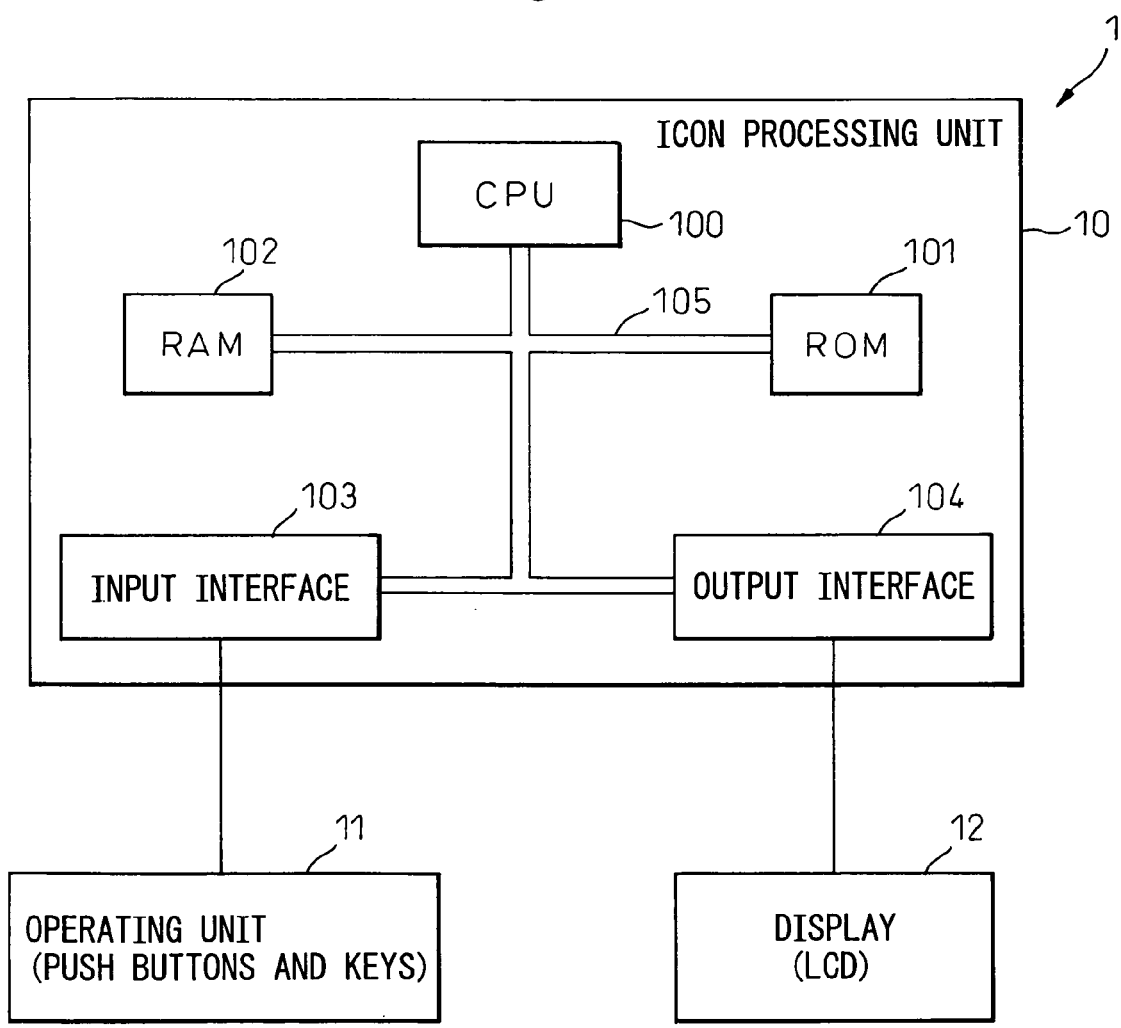
FIG. 1 is a block diagram showing an icon display device in accordance with an embodiment of the present invention.

Referring to the drawings, an embodiment of the present invention will be described below.

FIG. 1 is a block diagram showing an icon display device in accordance with the embodiment of the present invention. FIG. 1 shows an icon display device 1 in accordance with the embodiment of the present invention, that is, shows an outline configuration of a portable cellular phone. An operating unit 11 and a display (liquid-crystal display) 12 are connected to an icon processing unit 10.

The icon processing unit 10 includes a central processing unit (CPU) 100, a ROM 101, a RAM 102, an input interface 103, an output interface 104, and a bus 105 over which these components are interconnected so that they can communicate with one another.

The CPU 100 controls the entire portable cellular phone and runs an icon display program, which will be described later, stored in the ROM 101. The CPU 100 computes and manipulates data written in the RAM 102 via the input interface 103 according to the icon display program stored in the ROM 101. The CPU 100 then transfers the resultant display data, which represents a document containing both characters and icons, to the display 12 via the output interface 104. An icon code registration table that will be described later is stored in the ROM 101 and is used to decide whether individual letters contained in a document are icons or characters. In the present embodiment, a static random-access memory (SRAM) is adopted as the RAM 102, and a fusible read-only memory (FROM) is adopted as the ROM 101.

The operating unit 11 is a unit having push buttons and keys thereof to be manipulated, and is used to transfer operational information via the input interface 103.

The display 12 receives the display data, which results from computation and manipulation performed by the CPU and represents a document, via the output interface 104, and displays the document on the screen thereof.

Characters and icons to be displayed on the icon display device in accordance with the embodiment of the present invention which will be described below are different from each other in terms of attributes.

FIG. 2 shows a concrete example of a document containing both characters and icons. Some portable cellular phones can display a document, which contains twenty characters per line and includes twenty lines (four hundred characters at most), on the screens thereof as long as an appropriate font size is designated. In the concrete example shown in FIG. 2, for convenience, a specific font size is designated so that a document containing ten characters per line and including three lines (thirty characters at most) can be displayed on the screen of the portable cellular phone 1.

Data items representing "あい", corresponding to "A B" in the alphabet, . . . e 山川, corresponding to "mountain and river" in English, . . . 雨に, corresponding to "with rain" in English," and "濡れてしまった。", corresponding to "got wet" in English, succeeding "雨に", corresponding to "with rain" in English, respectively that are included in a character string contained in a document containing both characters and icons, as shown in FIG. 2, are buffered in a predetermined area in the RAM 102. The buffer area has a predetermined storage capacity that is large enough to hold both data representing a document portion displayed in the entire field on the screen and data representing a document portion that extends outside the field on the screen and is not displayed. Numerals 0 to 9, 10 to 19, and 20 to 29 written above the character string are letter numbers i of letters contained in a document that contains both icons and characters. As shown in FIG. 2, in the example shown in FIG. 2, display data items representing respective characters are stored at positions identified with the letter numbers i that denote 0 to 2, 4, 5, 7 to 11, 14 to 20, and 22 to 29. Display data items representing respective icons are stored at positions identified with the letter numbers i that denote 3, 6, 12, 13, and 21.

Figure 3:
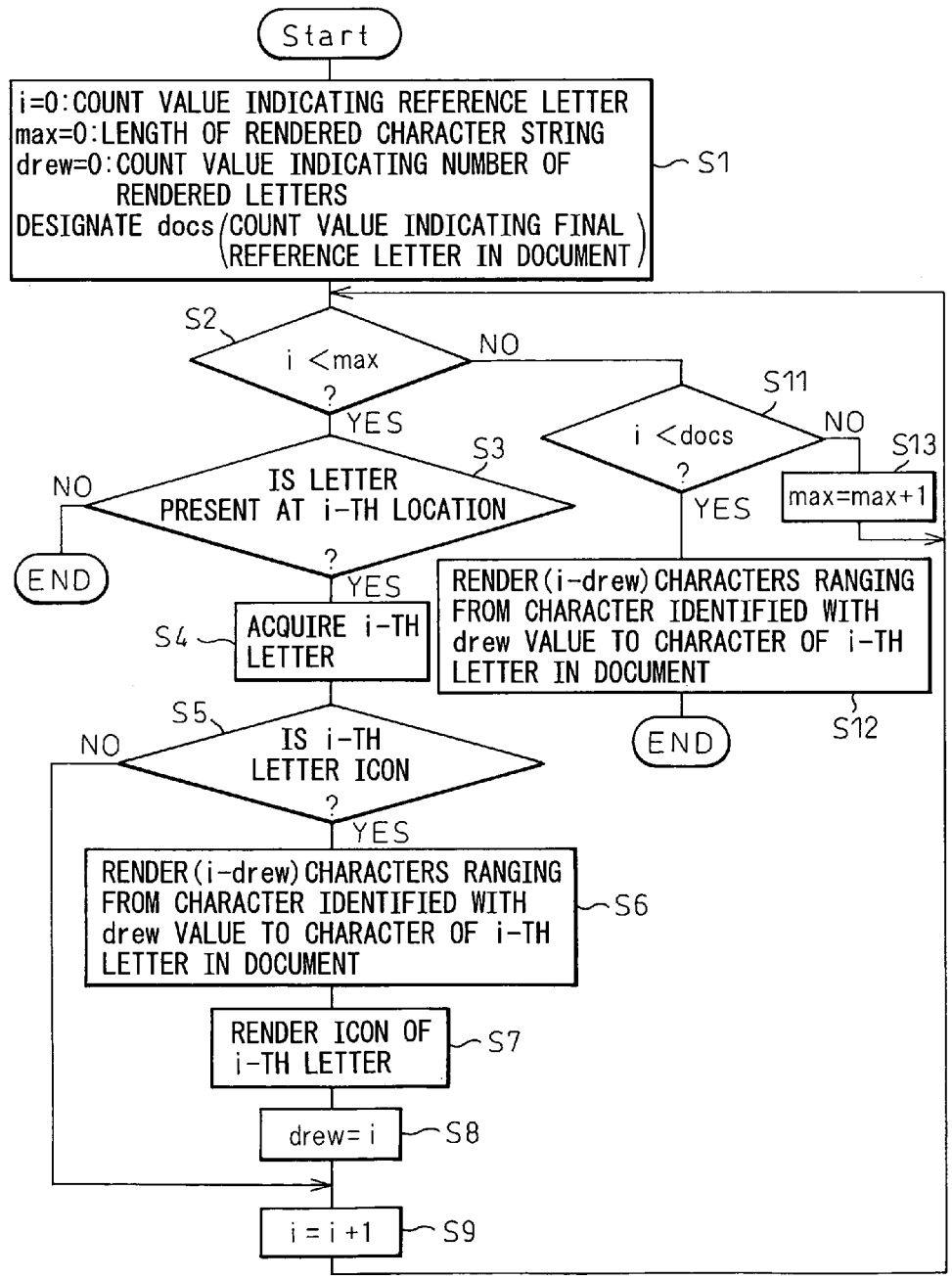
FIG. 3 is a flowchart describing an icon display routine in accordance with the embodiment of the present invention.

FIG. 3 is a flowchart describing an icon display routine in accordance with the embodiment of the present invention. The icon display routine in accordance with the embodiment of the present invention will be described below. Herein, the icon display routine is initiated in order to display on the screen a document newly created using the portable cellular phone 1, a document that is not yet transmitted or has been transmitted as an e-mail, or a document that has been received as an e-mail. Otherwise, the icon display routine is initiated in order to scroll a displayed screen image, that is, vertically or laterally move a displayed text for the purpose of displaying a document portion that extends outside the field on the display screen and is not displayed. Incidentally, scrolling and displaying methods include: a method of handling a document so that the entire document including a portion which extends of the display field can be displayed, then transferring data, which represents a document portion to be displayed on the screen, in response to a scrolling manipulation, and then displaying the document portion on the screen; and a method of handling a document so that the document portion be displayed on the screen can be displayed, and then displaying the document portion in response to a scrolling manipulation. The present embodiment adopts the latter method.

First, at step S1, values are initialized. Specifically, a count value i indicating a letter to be referenced is reset to 0. The length max of a character string that has been rendered is reset to 0. A count value drew, indicating the number of characters having been rendered, is reset to 0. Herein, the count value i indicating a letter to be referenced is equivalent to the letter number i shown in FIG. 2. Moreover, a count value docs indicating a final reference letter in a document is designated. When a document is displayed over the entire display field on the screen of the display 12, the count value docs indicating the final reference letter is set to the known maximum number of letters that can be displayed on the screen. When a document is displayed in part of the display field on the screen, the count value docs indicating the final reference letter is set to the number of letters contained in the document portion displayed on the screen. In the latter case, the number of letters contained in the document should be counted in advance.

At step S2, a decision is made on whether i<max is established. If i<max is established, control is passed to step S3. If i≧max is established, control is passed to step S11.

At step S3, a decision is made on whether letter data representing a letter of a letter number i (hereinafter, an i-th letter) is present. If the decision is made in the affirmative (Yes), control is passed to step S4. If the decision is made in the negative (No), the routine is terminated. For a blank display, letter data is present. Therefore, for the blank display, control is passed to step S4. Whether letter data is present at the i-th location is decided by checking whether a character code corresponding to the letter data is registered in advance and stored in the ROM 101.

At step S4, letter data representing the i-th letter is acquired.

An icon registration table will be described below.

FIG. 4 shows the icon registration table. Character codes, colors, and background colors that are associated with icons are registered in advance in the icon registration table shown in FIG. 4. The icon registration table is stored in the ROM 101. Referring to FIG. 4, the registered numbers of icons, icons, character codes, colors, and background colors are listed in that order from the leftmost column. A character code is registered data unique to each icon. A color and a background color are the attributes of each icon and can be arbitrarily registered for each icon. Consequently, for example, in relation to the registered number 1, an icon of a heart, a character code of 123*aaa*, the color of the heart of red, and a background color of white are registered. In relation to the registered number 11, an icon of a heart, a character code of 123*aab*, the color of the heart of blue, and a background color of white are registered. In the present embodiment, as attributes shared by characters, a color is set to black and a background color is set to white. Consequently, the attributes shared characters and the attributes of each icon are different from each other.

The flowchart of FIG. 3 will be referred to again.

At step S5, a decision is made on whether the i-th letter is an icon. The decision is made by checking whether the character code representing the i-th letter agrees with any of character codes registered in association with respective icons in the icon registration table shown in FIG. 4. If the decision is made in the affirmative (Yes), control is passed to step S6. If the decision is made in the negative (No), control is passed to step S9. With the processing, a document is searched to see if an icon appears.

At step S6, after the attributes shared by (i-drew) characters ranging from the character identified with the drew value to the character of the i-th letter in a character string are designated, the characters are rendered. With the processing, characters that successively appear until an icon appears are rendered.

At step S7, after the attributes of the icon of the i-th letter are designated, the icon of the i-th letter is rendered. With the processing, after characters that successively appear until an icon appears are rendered, the icon is rendered.

At step S8, the drew value is set to the i value (drew=i).

At step S9, the i value is incremented by 1 (i=i+1), and control is returned to step S2. With the processing, the number of characters that successively appear until an icon appears is counted.

On the other hand, if i≧max is established at step S2, control is passed to step S11. At step S11, whether drew<docs is established is decided. If drew<docs is established, control is passed to step S12. If drew≧docs is established, control is passed to step S13.

At step S12, (i-drew) characters ranging from the character identified with the drew value to the character of the i-th letter in the character string are rendered.

At step S13, the max value is incremented by 1 (max=max+1), and control is returned to step S2.

Referring to the flowchart of FIG. 3, a procedure of displaying the document shown in FIG. 2 will be described below.

First, at step S1, the i, max, and drew values are initialized to 0s.

Since a decision is made in the negative (No) at step S2, control is passed to step S11. Since a decision is made in the negative (No) at step S11, control is passed to step S13. The max value is incremented by 1, that is, max=max+1 is worked out, and control is returned to step S2.

Thereafter, as a decision is made in the affirmative (Yes) at step S2, control is passed to step S3. A decision is made in the affirmative (Yes) at step S3. The i=0-th letter, that is, the character of "あ", corresponding to "A" in the alphabet, is acquired at step S4, and control is passed to step S5. Since the i-th letter is not an icon, control is passed to step S9. The i value is incremented by 1, that is, i=i+1=1 is worked out, and control is passed to step S2.

A decision is made in the negative (No) at step S2, and control is passed to step S11. Since a decision is made in the negative (No) at step S11, control is passed to step S13. The max value is incremented by 1, that is, max=max+1=2 is worked out, and control is returned to step S2.

A decision is made in the affirmative (Yes) again at step S2, and control is passed to step S3. A decision is made in the affirmative (Yes) at step S3. The i=1-th letter, that is, the character of "い", corresponding to "B" in the alphabet, is acquired, and control is passed to step S5. Since the i-th letter is not an icon, control is passed to step S9. The i value is incremented by 1, that is, i=i+1=2 is worked out, and control is returned to step S2.

A decision is made in the negative (No) for the third time at step S2, and control is passed to step S11. A decision is made in the negative (No) at step S11, and control is passed to step S13. The max value is incremented by 1, that is, max=max+1=3 is worked out, and control is returned to step S2.

A decision is made in the affirmative (Yes) for the third time at step S2, and control is passed to step S3. A decision is made in the affirmative (Yes) at step S3. The 2nd letter (i=2), that is, the character of "う", corresponding to "C" in the alphabet, is acquired at step S4, and control is passed to step S5. Since the i-th letter (i=i) is not an icon, control is passed to step S9. The i value is incremented by 1, that is, i=i+1=3 is worked out, and control is returned to step S2.

A decision is made in the negative (No) for the fourth time at step S2, and control is passed to step S11. Since a decision is made in the negative (No) at step S11, control is passed to step S13. The max value is incremented by 1, that is, max=max+1=4 is worked out, and control is returned to step S2.

A decision is made in the affirmative (Yes) for the fourth time at step S2, and control is passed to step S3. Since a decision is made in the affirmative (Yes) at step S3, the i=3-th letter, that is, an icon of a heart (see i=3 in FIG. 2) is acquired at step S4. Control is then passed to step S5. Since the i-th letter is an icon, control is passed to step S6. After the attributes shared by the three (=i-drew) characters "あいう", corresponding to "A B C" in the alphabet, ranging from the character identified with the drew value of 0 to the character of the third letter (i=3) are designated, the characters "あいう", corresponding to "A B C" in the alphabet, are rendered. After the attributes of the i=3-th letter of the icon of the heart (see i=3 in FIG. 2) are designated at step S7, the icon of the heart is rendered. The drew value is set to 3 at step S8, and control is passed to step S9. The i value is incremented by 1, that is, i=i+1=4 is worked out. Control is then returned to step S2.

A decision is made in the negative (No) for the fifth time at step S2, and control is passed to step S11. Since a decision is made in the negative (No) at step S11, control is passed to step S13. The max value is incremented by 1, that is, max=max+1=5 is worked out, and control is returned to step S2.

Thereafter, steps S2 to S13 are repeatedly executed. After the character or icon of the 0-th letter in the document is rendered, when the last letter in the document appears, a decision is made in the affirmative (Yes) at step S11. As for the example shown in FIG. 2, when the i value comes to 21, an icon is rendered. When the i value comes to 29, the last letter in the document appears. At this time, the decision is made in the affirmative (Yes) at step S11. At step S12, after the attributes shared by eight characters ranging from the character identified with the drew value of 21 to the character of the twenty-ninth (i=29) letter, that is, "をで雨に", corresponding to "with rain as I forgot" in English, are designated, the eight characters are rendered. The routine is then terminated.

The character display device in accordance with the present invention has been described by taking for instance a case where in a document containing both characters and icons, the attributes shared by characters are different from the characters of an icon. The present invention is not limited to this case but can be applied to rendering of a document containing characters that share the attributes different from the attributes shared by characters and icons, for example, characters having the first attribute, that is, characters to be rendered in black, and characters having the second attribute, that is, characters to be rendered in blue.

What is claimed is:

1. A character display device that displays a document, the character display device comprising:
 a searching unit to search for an icon being a picture by determining whether or not a character of the document stored in a memory is the icon according to an order of the characters of the document,
 a counting unit to count the number of characters, each of the characters not being the icon until the icon is found by the searching unit,
 a rendering unit to,
  set a first display attribute to all of the characters counted by the counting unit based on the counted number of characters when the icon is found by the searching unit and render all of the characters having the set first display attribute, and
  set a second display attribute to the found icon and render the icon having the set second display attribute after all of the characters having the set first display attribute are rendered.

2. The character display device according to claim 1, further comprising:
 a registration table to store a character code of the icon;
 wherein the searching unit determines whether or not a character code of a character of the document is registered in the registration table.

3. A character display method, performed by a processor, for displaying a document, the method comprising:
 searching for an icon being a picture by determining whether or not a character of the document stored in a memory is the icon according to an order of the characters of the document;
 counting the number of the characters, each of the characters not being the icon until the icon is found by the searching;
 setting a first display attribute to all of the characters based on the counted number of characters when the icon is found and rendering all of the characters having the set first display attribute; and
 setting a second display attribute to the icon and rendering the found character having the set second display attribute after all of the characters having the set first display attribute are rendered.

4. The character display method according to claim 3, wherein the searching includes determining whether or not a character code of a character of the document is registered in a registration table storing a character code of the icon.

5. A non-transitory computer readable medium with an executable program stored thereon to display a document, wherein the program instructs a processor to perform the following:
 searching for an icon being a picture by determining whether or not a character of the document stored in a memory is the icon according to an order of the characters of the document;
 counting the number of characters, each of the characters not being the icon until the icon is found by the searching;
 setting a first display attribute to all of the characters based on the counted number of characters when the icon is found and rendering all of the characters having the set first display attribute; and
 setting a second display attribute to the found icon and rendering the icon having the set second display attribute after all of the characters having the set first display attribute are rendered.

6. The non-transitory computer readable medium according to claim 5, wherein the searching includes determining whether or not a character code of a character of the document is registered in a registration table storing a character code of the icon.

* * * * *